Sheet 1, 6 Sheets.

E. B. Bigelow.
Pile Fabric.

No. 432.

Reissued Feb. 24, 1857.

Sheet 2, 6 Sheets.

E. B. Bigelow.

Pile Fabric.

No. 432. Reissued Feb. 24, 1857.

E. B. Bigelow.
Pile Fabric.

No. 432. Reissued Feb. 24, 1857.

E. B. Bigelow.
Pile Fabric.

No. 482.

Reissued Feb. 24, 1857.

Sheet 5, 6 Sheets.

E. B. Bigelow.

Pile Fabric.

No. 432.

Reissued Feb. 24, 1857.

No. 432.
E. B. Bigelow.
File Feeder.
Patented Feb. 24, 1857.
Sheet 2, 6 Sheets.
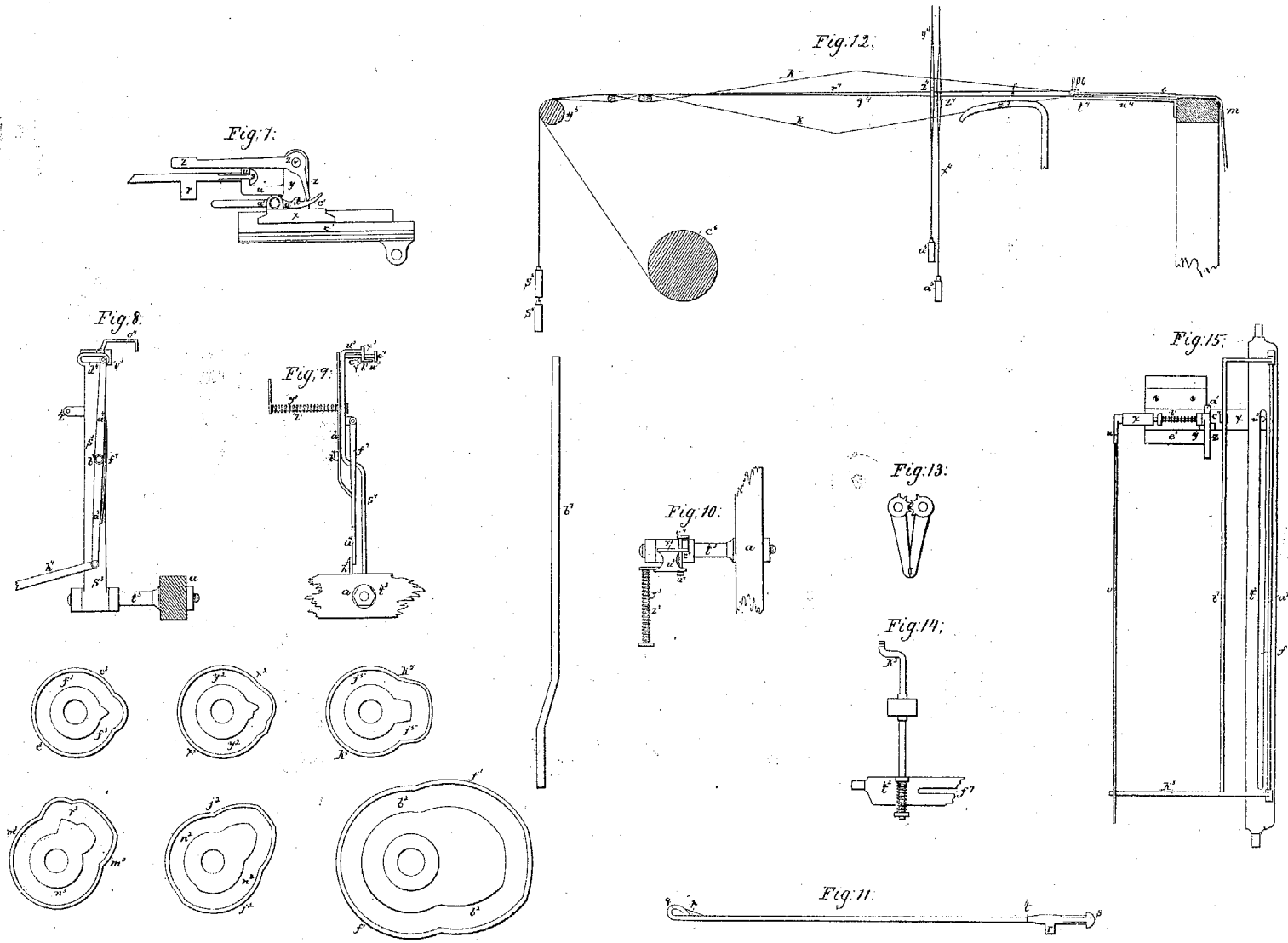

UNITED STATES PATENT OFFICE.

ERASTUS B. BIGELOW, OF BOSTON, MASSACHUSETTS.

IMPROVEMENT IN LOOMS FOR WEAVING PILE FABRICS.

Specification forming part of Letters Patent No. 10,222, dated November 15, 1853; Reissue No. 432, dated February 24, 1857.

*To all whom it may concern:*

Be it known that I, ERASTUS B. BIGELOW, of Boston, in the county of Suffolk and State of Massachusetts, have invented certain new and useful Improvements in the Power-Loom for Weaving Looped and Velvet Pile Fabrics; and I do hereby declare that the following is a full, clear, and exact description of the principle or character which distinguishes them from all other things before known, and of the manner of making, constructing, and using the same, reference being had to the accompanying drawings, in which—

Figure 1:
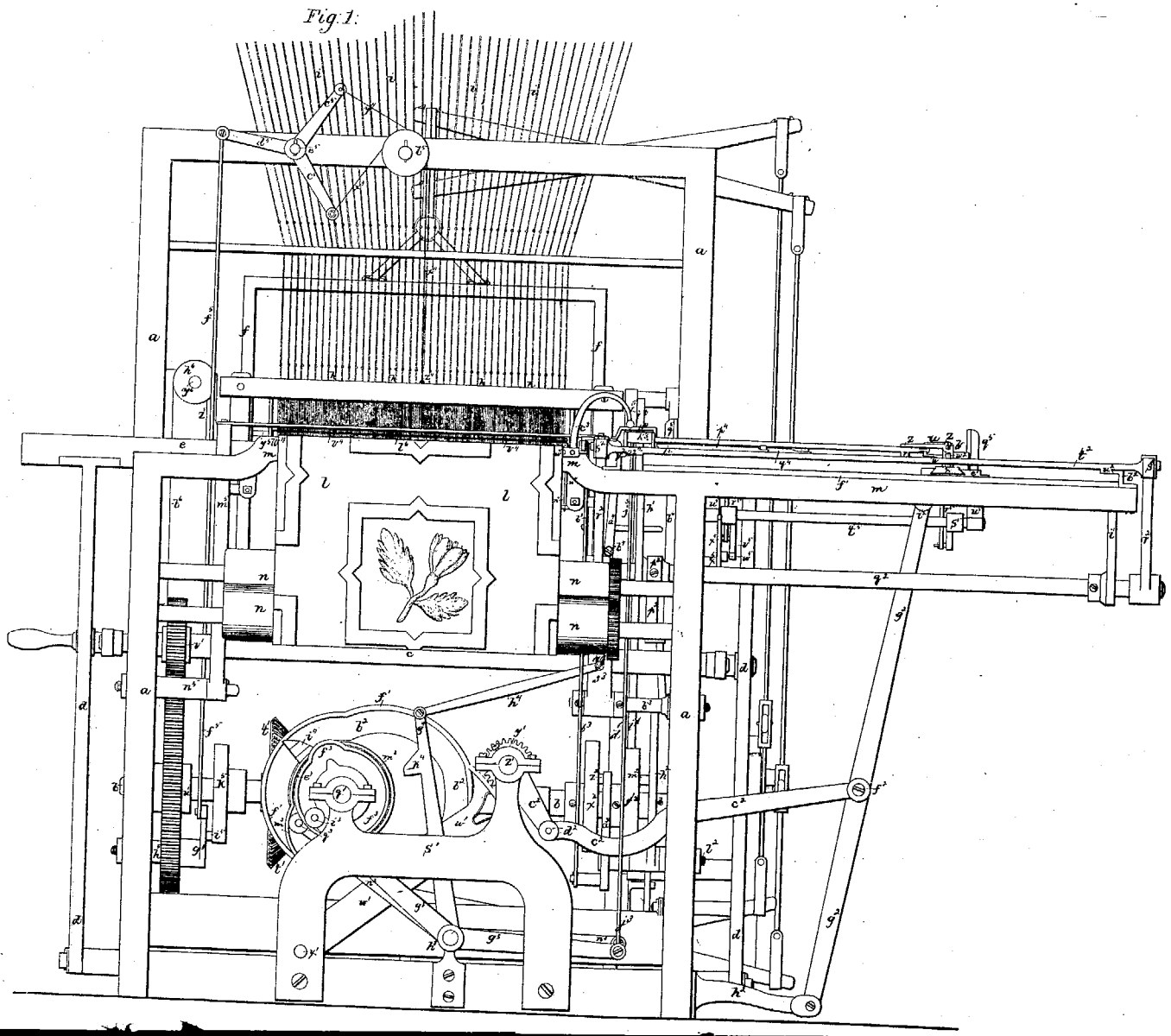
Figure 2:
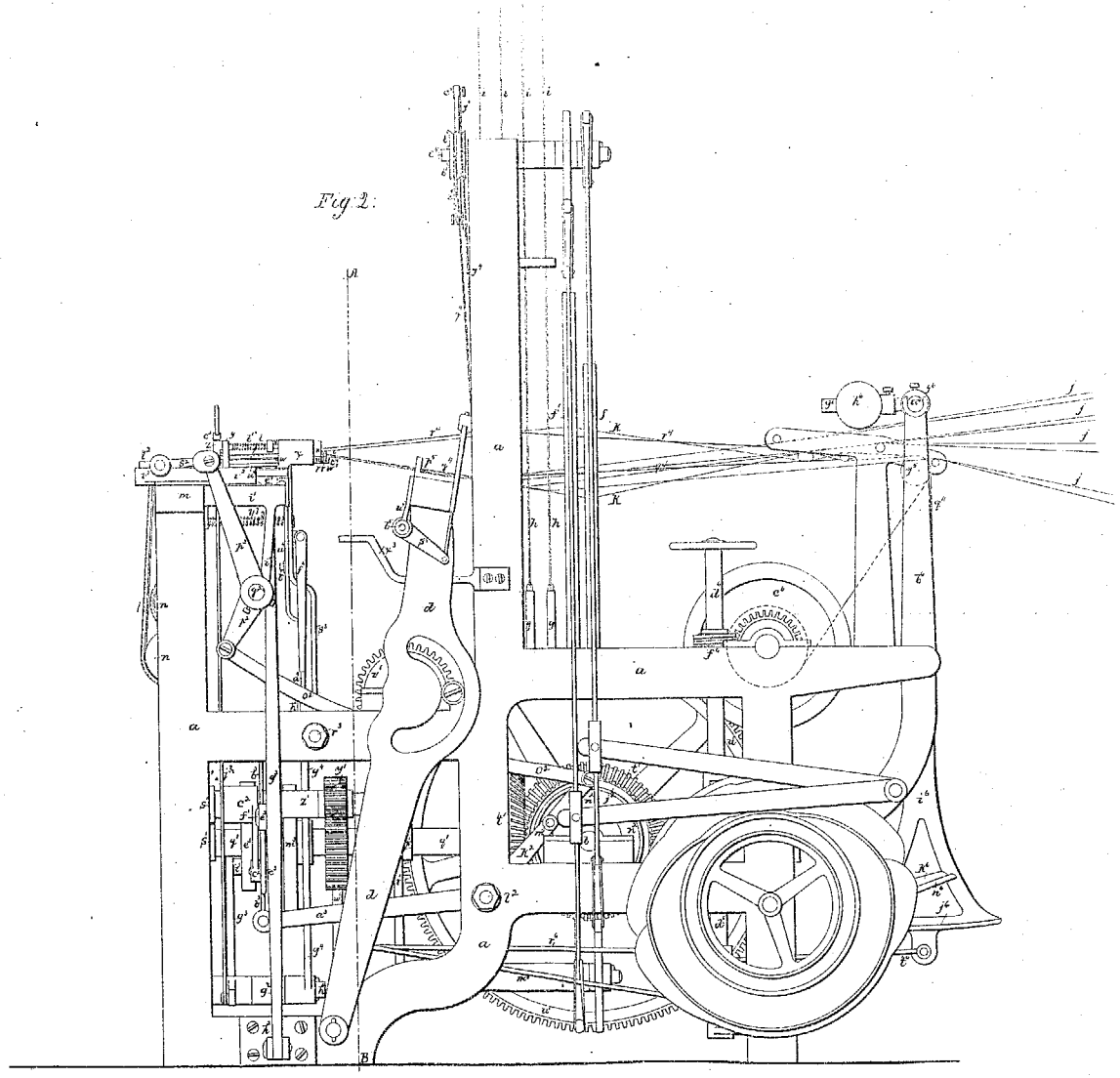
Figure 3:
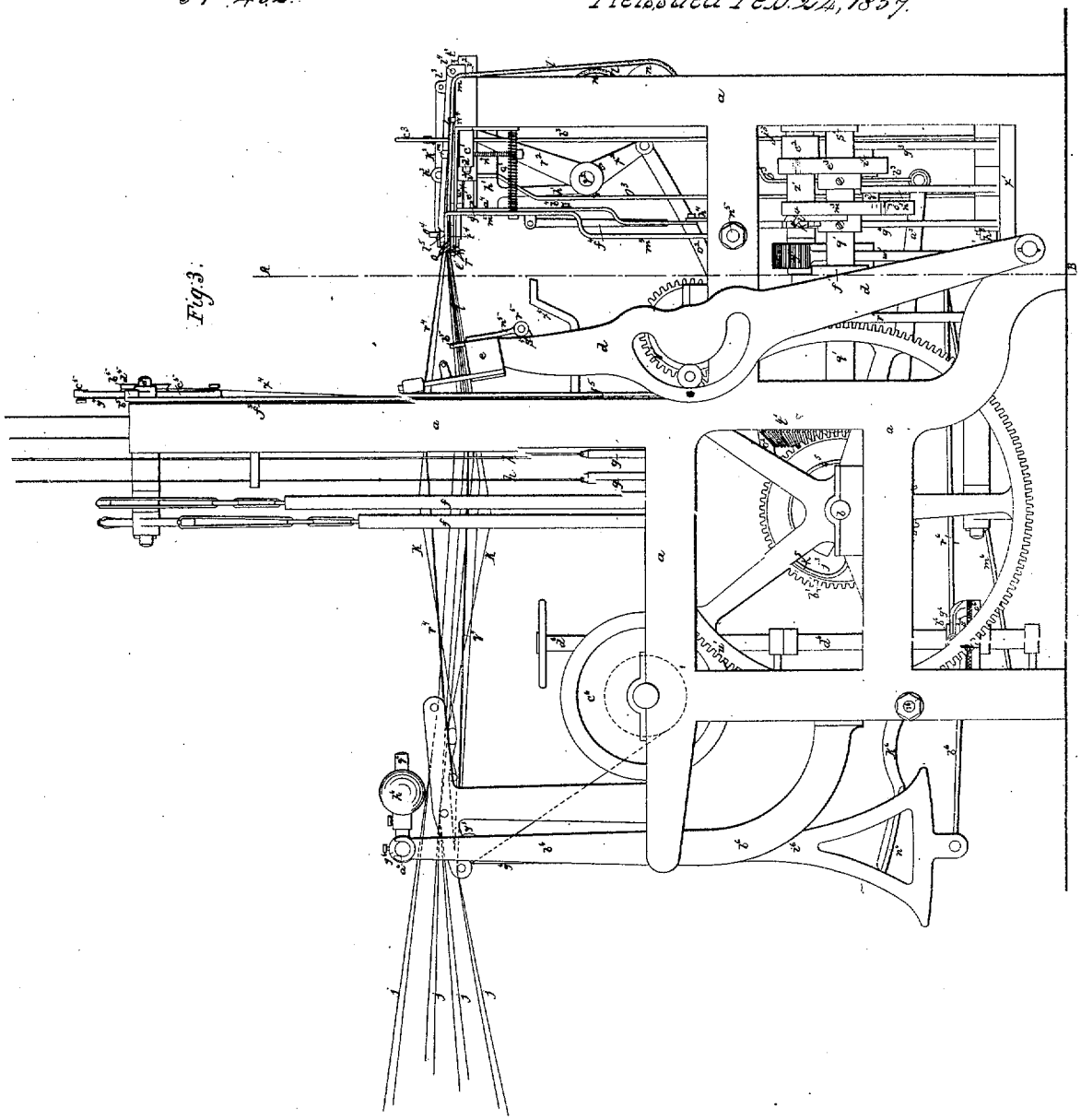
Figures 4, 6:
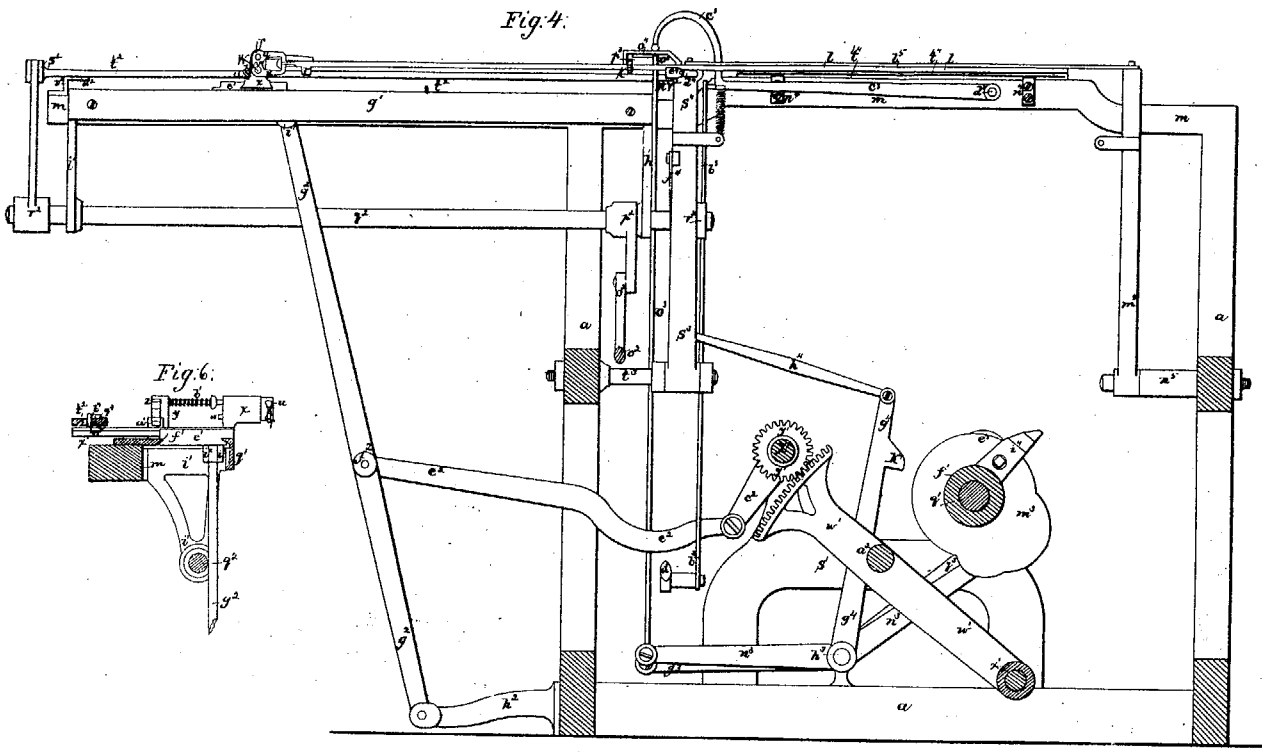
Figure 5:
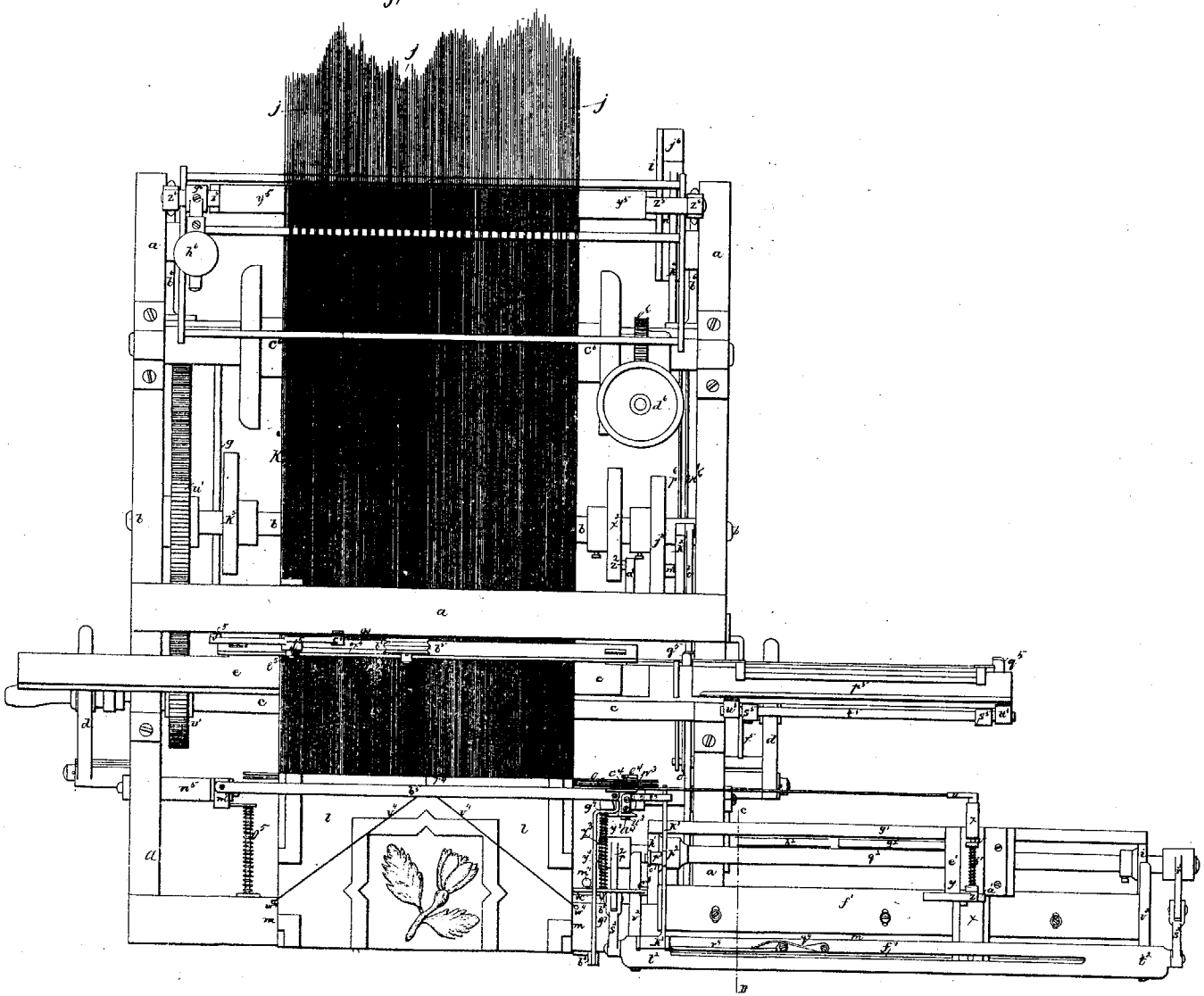

Figure 1 is a front elevation of so much of the loom as is necessary to exemplify my improvements; Fig. 2 is a right-hand end elevation of the same. Fig. 2 is a left-hand end elevation; Fig. 4, a vertical section taken on the red line A B in Figs. 2 and 3, looking to the front of the loom. Fig. 5 is a plan. Fig. 6 is a cross-section of the breast-beam and pincher-ways, taken on the red line C D, Fig. 5 looking to the right. Fig. 7 is an enlarged front elevation of the pinchers and slide detached. Figs. 8, 9, and 10 represent the wire-holder detached. Fig. 11 is a side view of a pile-wire. Fig. 12 is a section of the warps, showing the horizontal guides for guiding the pile-wires. Figs. 13, 14, and 15 are modified forms of guides to work in unison with the pinchers.

The same letters indicate like parts in all the figures.

My invention relates to the mode of operating the pile-wires over which the pile is formed, and also to the mode of delivering out the unwoven warps during the process of weaving.

The parts of my invention which relate to operating the pile-wires are particularly applicable to the power-loom for weaving looped and velvet pile fabrics, in which a series or optional number of pile-wires are used. Heretofore the pinchers or other analogous devices which have been employed in the power-loom to successively act upon the pile-wires have been so constructed and operated as to withdraw them from the cloth, carry them back toward the reed, and deposit them in the open shed of the warps, to be pushed forward by the lathe to the face of the cloth.

A part of my invention, therefore, consists in constructing and operating the pinchers or other analogous devices for successively acting upon the pile-wires so that they shall not only successively withdraw said wires from the cloth, carry them back toward the reed, and insert them and leave them free in the open shed of the warps, as heretofore done, but shall also carry them forward to the face of the cloth or cloth-forming line, and hold them in position with their proper edges upward until they are otherwise secured. When pinchers of the ordinary construction are employed to successively withdraw, insert, and hold the pile-wires, as aforesaid, it is difficult to avoid collision with the shuttle-box of the lathe.

A part of my invention, therefore, consists in the mode of constructing the pinchers, whereby collision with the shuttle-box may be avoided.

A part of my invention also consists in the application or employment of a support or guide so constructed and organized with respect to the other parts of the loom as to successively receive the inner ends of the pile-wires as they are drawn from the cloth by the pinchers, (or other equivalent instruments which may be employed therefor,) carry them back to the position where they are to be inserted in the open shed of the warps, and guide them as they are being introduced therein, the motion of said support or guide toward and from the lathe being in appropriate unison with the instrument or instruments which may be employed to carry the outer ends of said wires.

A part of my invention also consists in the employment of long longitudinal guides, to guide and support the pile-wires as they are being passed between the warps, so arranged that said wires may slide endwise upon them as they enter the open shed, and sidewise toward or from the breast-beam in unison with the pinchers or their equivalents which insert them. And a part of my invention also consists in the employment of a box, latch, or holder so constructed and organized with respect to the parts of the loom as to hold the pile-wires with their proper edges upward at the fell of the cloth; also, hold said wires in a suitable position to be successively acted upon by said pinchers or their equivalent, and guide and adapt said pinchers or their equivalents to a proper relative position to engage with said wires. When the cutting-knife is used on the end of flat or oval-shaped wires to cut the pile as they are drawn from the cloth, they have a tendency to turn when being drawn out, and thus cut the pile of uneven length.

A part of my invention, therefore, consists in the employment of a bar or guide to successively press against said wires to keep them in a proper position during the operation of cutting.

Another part of my invention relates to the delivery of the warps, and is an improvement upon a certain let-off and take-up motion originally patented by me in 1845 and reissued in 1849.

The nature of this part of my invention consists in applying the tension weight and brake to an arm or arms extending from the whip roller or frame in which said roller vibrates, whereby I am enabled to make the apparatus more sensitive to the action of the yarn, and consequently more perfect in its operation, and also save expense in making the apparatus.

*a a a* represent the frame of the loom.

*b* represents the cam-shaft, and *c* the lathe-shaft, which are geared together in the usual way by the cogged wheels *u'* and *v'*, the ratio of which is as one to four.

*d d* represent the swords of the lathe, and *e* the race beam.

*f f* represent the leaves of heddles for the ground-warps.

*g g g* represent the harness-weights, *h h h* the mails, and *i i* the Jacquard harness-cords, the Jacquard machine being removed.

*j j* represent the figuring-warps, and *k k* the ground-warps, and *l* the woven cloth, which passes over the breast-beam *m* to the take-up rollers *n n*.

The above-named parts being such as are in common use, no further description of them is required, nor have I thought it necessary to represent in the drawings the mode of stopping and starting the machine, nor the let-off and take-up motion, nor other well-known parts of a loom, except so far as they are required to illustrate and exemplify my improvements.

*o o o* represent the pile-wires woven into the cloth.

Fig. 11 gives a side view of one of the pile-wires provided with the knife *p* for cutting the pile.

*q* represents an eye or head on the inner end of the wire to guide it as it passes between the warps, and to aid in sustaining it in a proper position to cut the pile of an even length when being drawn out.

*r* represents an arm or projection extending from the under side of the wire to aid in keeping it with its proper edge upward.

*s* is another head on the outer end of the wire to secure the hold of the pinchers.

The widest part of the wire may be made separately and joined to the other part at *t* by brazing.

The pinchers for successively operating the pile-wires are constructed with two jaws, *u u*, which open and close to release and grasp the pile-wires, in the direction of a line parallel to said wires, as will be seen by inspecting the drawings, in which the pinchers are represented as drawing one of said wires from the cloth, which operation is supposed to be nearly completed. The ends of the jaws *u u* which grasp the outer ends of the pile-wires are shaped and grooved to conform to said wires, as shown in Fig. 7, while their reverse ends are affixed to their respective shafts *v* and *w*. To cause both of the jaws *u u* to work in conjunction, they are provided with cogs or teeth which engage with each other, as represented in Fig. 4. The shafts *v* and *w* turn in and are supported by the upper part of the pincher-stand *x*. The shaft *v* extends forward through a projection, *y*, to a convenient point for giving motion thereto.

*z* represents a bent lever affixed to the shaft *v*, for closing the jaws *u u* of the pinchers, and *a'* represents a latch-lever for holding said jaws *u u* in a closed position, and *b'* a helical spring, which tends to throw them open.

When a wire is to be grasped by the pinchers, the horizontal arm of the bent lever *z* is forced down, by means hereinafter to be described, until the jaws *u u* clasp the wire, and the lighter and notched arm of the latch-lever *a'* rises up to secure the grip by the projection *c'* engaging with the point of the dependent arm of said bent lever *z*; then, when the wire is to be released, the projection *c'* is disengaged from the said dependent arm, and the helical spring *b'* throws the jaws *u u* of the pinchers open until arrested by the said dependent arm striking against the projection *d'* on the latch-lever *a'*.

By constructing the pinchers in the manner above described, I am enabled to make the grooves for the wires of the jaws of said pinchers near the inward extremity of the parts thereof, and thus render it easy to avoid collision with the shuttle-box of the lathe. The pinchers require to have a motion towards and from the cloth to withdraw and insert the pile-wires, and toward and from the lathe to carry said wires forward to the open shed and back to the face of the cloth. To allow the pinchers to be moved toward and from the lathe, the edges of the bottom part of the pincher-stand *x* are shaped like ways, and slide in corresponding grooves in the sliding plate *e'*. To allow the said pinchers to be moved toward and from the cloth, two opposite edges of the sliding plate *e'* are grooved to conform to the ways *f'* and *g'*, on which they respectively slide. The way *f'* is screwed to the top of the breast-beam *m*, and the way *g'* is supported by the stands *h'* and *i'*, which are bolted to and extend forward from the breast-beam *m*. Motion is given to the sliding plate *e'*, to carry the pinchers toward and from the cloth, by the double-acting cam $f'$ on the shaft $q'$. The shaft $q'$ turns in suitable bearings in the stands $r'$ and $s'$, and is connected with the cam-shaft $b$ by the beveled cogged wheels $t'$ $t'$, which are of an equal number of teeth. $w'$ represents a lever, the lower end of which vibrates on the stud $x'$, while the upper end has a segment of a gear which engages with the cogged pinion $y'$ and turns the crank-shaft $z'$.

$a''$ represents a cam-roller on the side of the lever $w'$, which plies in the groove $b''$ of the cam $f'$. The crank-shaft $z'$ turns in suitable bearings in the before-mentioned stands $r'$ and $s'$, and has the crank-arm $c''$ affixed to it, on the side of the outer end of which the stud-pin $d''$ projects.

$e''$ represents a connecting-bar, which connects the stud-pin $d''$ to a similar stud-pin, $f''$, in an upright lever, $g''$. The upright bar $g''$ vibrates at its lower end on a pin in the stand $h''$, while its upper end is connected to the sliding plate $e'$ by the connecting bar $i''$. When, therefore, the pinchers are to be moved from the cloth to draw a wire, the said cam $f'$ forces downward the said lever $w'$, and the reverse when said pinchers are to be moved toward the cloth, the motion being communicated to the pinchers by the parts just described. The pinchers are moved toward and from the lathe by the double-acting cam $j''$ on the cam-shaft $b$.

$k''$ represents a lever which vibrates on the stud $l''$ at its lower end, and has the roller $m''$ on its side, which plies in the groove $n''$ in the side of the cam $j''$, before mentioned.

$o''$ represents a connecting-bar, the rearward end of which is jointed to the upper end of said lever $k''$, while its forward end is jointed to an arm, $p''$, on the rock-shaft $q''$. The rock-shaft $q''$ rocks in suitable bearings in the stands $h'$ and $i'$ and has on each end an upright arm, $r''$.

$s''$ $s''$ represent connecting bars, the rearward ends of which are respectively jointed to the upper ends of the said upright arms $r''$ $r''$, while their forward ends are connected with a sliding bar, $t''$. On the under side of the sliding bar $t''$ are the projections $u''$ $u''$, in which suitable grooves are formed to slide on their respective ways $v''$ $v''$. The ways $v''$ $v''$ are provided with feet, by which they are secured to the top of the breast-beam $m$.

$w''$ represents a stud-pin, projecting upward from the pincher-stand through the slot $f^7$ in the said sliding bar $t''$, which connects the said pincher-stand $x$ and sliding bar $t''$ together; but, in order that the pinchers may at the same time be free to move toward and from the cloth, the slot $f^7$ is made long enough to allow said stud-pin $w''$ to traverse therein the extent of said motion.

The mode of latching the pinchers to grasp a pile-wire is as follows: The cam $x''$ on the cam-shaft $b$ has a groove, $y''$, in which the cam roller $z''$ plies. $a'''$ represents a bent lever, which vibrates on the stud $l''$, and has the cam-roller $z''$ at one end, while the other end is jointed to the lower end of the connecting-rod $b'''$. The upper end of the connecting-rod $b'''$ is jointed to the latching lever $c'''$, which vibrates on the stud $d'''$ at one end, while the other end is bent somewhat in the form of a semicircle, to bring the point thereof to a proper position to act on the bent lever $z$, before described, to latch the pinchers. The groove $y''$ is so formed as to depress the latching-lever $c'''$, at the proper relative time to latch the pinchers and elevate it again after the operation has been performed. To unlatch the pinchers, the cam $e'''$ on the shaft $q'$ is employed. $g'''$ represents a bent lever, which vibrates on the stud $h'''$ and has at one end the cam roller $i'''$, which plies in the groove $f'''$ in the cam $e'''$, while the other end is jointed to the upright rod $j'''$. The rod $j'''$ is kept in position at its upper end by the guide-stand, in which it slides, and, when elevated by the cam $e'''$, strikes against the under side of the straight and heaviest arm of the latch-lever $a'$ and releases the catch $c'$ to allow the jaws of the pinchers to be thrown open, in the manner above described. When the rod $j'''$ is withdrawn from the latch-lever $a'$, the straight, which is also the heaviest, arm of said lever throws the other arm upward to secure the hold of the pinchers upon the pile-wires, as before described.

The support or guide which moves in unison with the pinchers or their equivalents, to successively receive the inner ends of the pile-wires as they are drawn from the cloth, carry them to and guide them between the open shed, will now be described.

$k'''$ repr sent the guide in question, which vibrates on the stud $h'''$ at its forward end, and terminates at the other end in the form of the letter U, into which the ends of the wires successively fall as they are drawn from the cloth. When the pinchers approach near to the edge of the cloth to insert or withdraw a wire, the rear end of the guide $k'''$ requires to be depressed to clear the jaws of the pinchers. The guide $k'''$ is elevated to a proper position to receive the ends of the pile wires as they are drawn from the cloth, and depressed at the proper time to clear the jaws of the pinchers, by the cam $m'''$, acting through the medium of the bent lever $n'''$ and connecting-rod $o'''$. The upper end of the connecting-rod $o'''$ is connected to the guide $k'''$ by the stud-pin $p''$, and its lower end to the horizontal arm of the bent lever $n'''$. To the other end of the bent lever $n'''$ the cam-roller $q'''$ is attached, which plies in the grove $r'''$ in the side of the cam $m'''$.

The box or holder for keeping the wires in position at the face of the cloth, after they are liberated by the pinchers, and for adapting said pinchers or their equivalents to said wires, may be understood as follows: The box or holder is connected with the upper end of a vertical bar, $s'''$ which vibrates at its lower end on the stud $t'''$. The upper end of the bar $s'''$ is bent back at a right angle with the upright part thereof, as represented by $u'''$, to bring it to a proper position to act upon the pile wires, and at the same time clear the race-beam. I would remark here that this bend is required only when comparatively few pile-wires are used, as in weaving velvet-pile carpets. The bent part $u'''$ is again turned up at the end, as represented in Fig. 9, to form a proper surface, $x'''$, to present to the pile-wires.

$v'''$ represents a projection which extends downward from the under side of the bent part $u'''$ and forms the front side of a box for receiving the weights or arms $r\ r\ r$ which projects from the under side of the pile-wire.

$w'''$ represents a projection which extends backward from the part $v'''$ and forms a support for the ends of the arms $r\ r\ r$ to rest upon, whereby the ends of the pile-wires are kept in a proper line. The surface $x'''$ is constantly pressed against the most forward wire of the series by the helical spring $y'''$, which encircles the rod $z'''$, so that the parts just described move freely with the pile-wires in the cloth and adapt themselves to the actual position of said wires during the operation of weaving.

From the foregoing description it will be obvious that the projection $v'''$, by acting on the front side of the arm $r$ of the most forward pile-wire of the series, will hold the whole series of wires from turning in that direction, and that the projection $w'''$ will prevent them from descending, and, as they have but little tendency to rise upward from a proper line, it remains only to prevent their turning backward toward the lathe, as they are successively brought to the face of the cloth, to properly secure them in position. To do this, the lever $a^4$ is arranged to vibrate on the stud $b^4$, extending from the front side of the bar $s'''$, and from its upper end the stud $c^4$ extends backward through the slot $d^4$, and supports the plate, latch, or hook, $e^4$ as represented in Figs. 8 and 9. The edge of the plate $e$ which presents itself toward the arms $r\ r$ of the pile-wires is made beveling so as to freely slide over said arms.

$f^4$ represents a spring which tends to throw the plate $e^4$ over the arms $r\ r$, to secure the pile-wires, when the lever $a^4$ is left free to move.

$g^4$ represents an upright lever which vibrates at its lower end on the stud $h^5$, and is connected at its upper end to the lower end of the lever $a^4$ by the connecting-rod $h^4$.

$i^4$ represents an arm extending from the cam $m^3$, which acts on the projection $k^4$ on the lever $g^4$. Just as each successive wire is brought to the face of the cloth by the pinchers or their equivalent, as before described, the arm $i^4$ withdraws the plate $e^4$ from the arm $r$ of the wire previously secured, so as to allow the wire thus brought forward to take its place beside the one which preceded it; then, just as the lathe presses said wire home, the arm $i^4$ ceases its action and allows the spring $f^4$ to throw said plate $e^4$ forward again to hold it in position.

In addition to holding the pile-wires in position, as described, the said box or holder has, as before stated, the functions of successively holding the wires in a proper position to be acted upon by the instruments employed to draw them from the cloth, and of adapting said instruments to a proper position to engage therewith.

$g^7$ represents a lever, the forward end of which turns on the stud $l^4$, while its rear end extends backward to a proper point to press upon the part $u'''$ of said vibrating box.

$m^4$ represents a rod which connects the lever $g^7$ with the lever $c^3$, above described.

$n^4$ represents a spring which, when the said lever $c^3$ is depressed to latch the pinchers, draws the back end of the lever $g^7$ in close contact with the part $n^3$, and firmly holds the box or holder.

$o^4$ represents a projection extending from the box or holder, which is so adjusted as to strike against the jaws $u\ u$ of the pinchers when they move forward from the lathe to grasp a wire, and arrest their motion in that direction at the proper point to grasp said wire. The pinchers have a capacity to yield to the action of the projection $o^4$ by reason of the bar $p^4$ on the sliding bar $t''$ being held against the stud $w^2$ only by the spring $q^4$.

To give a more connected idea of the operation of the several parts of the machinery employed to operate the wires, I will recapitulate the several motions in the order in which they occur. Supposing the loom to be in that stage of its operation in which the pinchers are about to draw a pile-wire from the cloth, as represented in the drawings, and the support or guide $k^3$ elevated to receive the inner end of the said pile wire, then, just as the said pile-wire is fully drawn out, the sliding bar $t''$ moves back toward the lathe, carrying with it the said pinchers, guide, and pile-wire to the proper point for introducing said wire into the open shed of the warps; then the pinchers advance toward the cloth with said wire, which wire is supported and guided by the said support or guide $k'''$ as it is inserted in said open shed of the warps, until the said pinchers have nearly completed this part of their movement, when the said support or guide is depressed to clear the jaws of said pinchers, and that end of the said wire which is in the said open shed is left to rest on the warps or upon other guides, as hereinafter to be described. Now, when the wire is completely inserted in the open shed of the warps it is carried forward by the pinchers and placed at the fell of the cloth, where it is either secured by the crossing of the warps upon it or by the box or holder, or both together, as the fabric to be wrought may require. When the said box or holder is employed to hold the wires at the fell of the cloth, the plate $e^4$, when the lathe strikes the wire and forces it into position, slides over or locks onto the projection $r$ on said wires and holds them in position. The pinchers are now opened to release their holds on said wire. The said sliding bar $t''$ then carries the said pinchers forward preparatory to their grasping another wire; but just before this forward movement of the pinchers is completed, the lever $c^3$ presses the lever $g^7$ down to firmly hold the aforesaid box or holder and arrest the pinchers in a proper position relative to the said wire to be grasped. The lever $c^3$ now completes its downward movement to latch the pinchers, which pinchers then move from the cloth to draw out the wire and insert it as before.

I would remark here that after the pinchers have released their grasp upon a wire they are moved toward the cloth a short distance, that the jaws may clear the heads $s$ $s$ on the wires in the cloth when they are moved forward to act upon another wire.

When pile-wires with eyes or heads on their inner ends are used, such as is represented in Fig. 11, said eyes or heads will rest upon the warps as they pass into the open shed, and no other support than the guide $k'''$ will be required to operate them; but when pile-wires without heads are used, (which must always be the case when the wires are to be drawn from under the loops without cutting them,) additional guide and support will be required between the warps, the guides for which will now be described.

$t^4$ represents a bar to support the cloth, which bar is sustained in its position by the stands $u^4$ $u^4$.

$s^4$ represents a cord or wire, the forward end of which is attached on the under side of the cloth to the bar $t^4$, while the rear end extends back over the whip-roller down to the weight $s^4$, which weight is suspended from it for the purpose of giving it tension.

$r^4$ represents another cord, similar to the one just described, which is attached above the cloth to the cord $v^4$. The ends of the cord $v^4$ are attached to their respective pins $w^4$ $w^4$, projecting from the breast-beam $m$.

$x^4$ and $y^4$ represent two cords, similar to the cords of a Jacquard harness, which are provided with the mails or eyes $z^4$ $z^4$, through which their respective cords $q^4$ and $r^4$ pass, and also the weights $a^5$ $a^5$ by which the said cords $x^4$ and $y^4$ are kept under a proper tension. The cords $x^4$ and $y^4$ pass over their respective friction-pulleys $b^5$ $b^5$ to their respective arms $c^5$ $c^5$ of the triple-armed lever $d^5$, which vibrates on the stud $e^5$.

$f^5$ represents a rod which connects the horizontal arm of the triple-armed lever $d^5$ with the lever $g^5$, said lever $g^5$ being arranged to vibrate on the stud $h^5$ at its rear end.

$i^5$ represents a cam-roller on the side of the lever $g^5$ which plies in the groove $j^5$ in the side of the cam $k^5$ on the cam-shaft $b$. The cam $k^5$, by acting on the lever $g^5$ and through the connecting parts, moves the triple-armed lever $d^5$, so as alternately to elevate and depress the cords $q^4$ and $r^4$—except when a pile-wire is being inserted in the shed of the warps, the cords or wires $q^4$ and $r^4$ remain in the position shown in Figs. 2 and 3; but when the end of the pile-wire which is being introduced has just passed the cords or wires $q^4$ and $r^4$, said cords or wires approach each other, as shown in Fig. 12, to guide and support said pile-wire while the operation of inserting it is being completed.

The number of pairs of guide cords or wires may be varied according to the length and size of the pile-wires to be used. When several pairs are used, they should not close upon the wire simultaneously; but in succession, as the end of the said pile-wire respectively passes them.

In weaving velvet-pile fabrics with flat or oval-shaped wires, with the cutting-knife on the end thereof to cut the loops, the wires sometimes have a tendency to turn out of a proper line toward the breast-beam. To prevent this I place a bar over the cloth forward of the pile-wires, as represented by $l^5$, which bar is supported at one end by the upright lever $s^3$, which supports the box or holder above described, while its other end is supported by another and similar upright lever, $m^5$. The lever $m^5$ vibrates at its lower end on the stud $n^5$, and its upper end is pressed forward by the spring $o^5$, in the same manner as the spring $y^3$ acts upon the lever $s^3$. When a wire is withdrawn from the cloth, the bar $l^5$, by being pressed against it by the springs $o^5$ and $y^3$, guides the knife in a right line during the operation of cutting the loops, and when the said wire is fully drawn out the bar $l^5$ comes in contact with the next wire of the series, and so on. The shuttles-boxes on the lathe usually project two inches or more forward of the reed, while the number of wires usually employed in weaving velvet fabrics do not extend more than from a half to three-fourths of an inch forward from the face of the cloth. From this it will be seen that, as the wires are drawn out during one movement of the lathe and inserted at another, the shuttle-box on the end of the lathe where the pinchers are located will come in collision with the wire when drawn from the cloth, unless some provision be made to avoid this result. One mode of doing this is to make the said shuttle-box movable, so that it may be elevated to clear the wire when the lathe advances to beat up the cloth.

$p^5$ represents the shuttle-box in the usual form, and $q^5$ $q^5$ the ways on which it slides.

$r^5$ $r^5$ are rods extending downward from the under side of the shuttle-box $p^5$ to their respective arms $s^5$ $s^5$, which extend from the rock-shaft $t^5$, which shaft turns in the stands $u^5$ $u^5$, projecting downward from the lathe.

$v^5$ represents another arm, which extends from said rock-shaft $t^5$ and has the roller $w^5$ at the end thereof, which, when the lathe moves forward, rests on the cam $x^5$ and elevates the shuttle-box, which descends again by its own gravity when the lathe recedes.

Instead of raising the shuttle-box, as aforesaid, the pinchers, after they have drawn a wire from the cloth, may be made to move forward or toward the front of the loom, with the said wire, to clear the shuttle-box when the lathe advances, then move back again as the lathe recedes to the point where the wire is to be inserted in the shed of the warps.

I now come to the last part of my invention, which relates to the mode of delivering out the warps. It is especially applicable to the let off motion by which the delivery of the warps is regulated by their tension, and by which the warps are free to yield at the opening of the shed, but are held firmly at the time the reed strikes the face of the cloth. The tension of the warps is made to regulate their delivery by acting upon a vibrating roller or bar, usually called the "whip-roller;" and it is important to its most successful action that the apparatus be so constructed that the tension-weight shall readily yield to the pull of the warps.

$y^5$ represents the whip roller or bar, from either end of which an arm, $z^5$, extends upward and terminates in the form of studs or bearings $a^6$ $a^6$, on which said roller or bar $y^5$ vibrates.

$b^6$ $b^6$ are stands which support said bearings or stands $a^6$ $a^6$.

$c^6$ represents the yarn-beam, and $d^6$ the let-off shaft; $e^6$ and $f^6$, the worm and gear, which operate in the usual way.

$g^6$ represents an arm extending directly from the whip-roller or frame in which it vibrates, and $h^6$ the tension-weight, which may be adjusted toward or from the center of motion, according to the degree of tension required upon the warps.

$i^6$ is an arm, which also extends directly from the whip-roller, and downward, and terminates in a segment of a flange, as represented by $j^6$.

$k^6$ represents a bent lever, the horizontal arm of which is provided with a flange, $n^6$, the outside of which is made to conform to the inside of the flange $j^6$.

$l^6$ represents a stud, on which the bent lever $k^6$ vibrates. The dependent arm of the lever $k^6$ is connected with the sword of the lathe by the rod $m^6$, so that when the lathe moves forward to the face of the cloth the flange $n^6$ is forced down upon the flange $j^6$, and holds the said whip-roller $y^5$ firmly during the beating up of the weft.

By applying the brake-lever and tension-weight directly to the whip-roller or frame in which said roller vibrates, as above described, the action of those parts is rendered more perfect, and the apparatus is less costly than when constructed as has heretofore been done.

$o^6$ represents a crown-ratchet to turn the let-off shaft $d^6$.

$p^6$ represents a lever, which vibrates on the let-off shaft $d^6$, just over the ratchet-wheel $o^6$, and carries on the end of an arm the pawl $q^6$, which acts upon the teeth of said ratchet, while the other arm is connected by the rod $r^6$ to the sword of the lathe which imparts motion thereto.

To cause the tension of the warps to act on the pawl $q^6$ and regulate their delivery, a vibrating plate, $s^6$, is placed between said pawl $q^6$ and the ratchet-wheel $o^6$ in the usual form. The plate $s^6$ is connected to the arm $i^6$ by the rod $t^6$, so that when the warps are being given out too fast the whip-roller $y^5$ falls back and causes the arm $i^6$ to draw the plate $s^6$ round to intercept the action of the pawl $q^6$; but when more warps are wanted than are being given out, the whip-roller $y^5$ is drawn forward and withdraws said plate $s^6$ away from said pawl $q^6$, and so regulates its action on the ratchet-wheel $o^6$.

The various parts of my invention, as above described, may be used together, as specified, or in connection with other devices. It will be obvious to machinists, also, that they may be greatly varied in form and structure without changing their essential character, as, for instance, instead of applying the holder or support which holds the pile-wires in a suitable position to be successively acted upon by the pinchers, or other equivalents to the arms $r$ $r$, it may be applied to any other part of said wires which the form of the instruments which act on them may render most convenient, and the plate or latch $e^4$, when not required to hold the pile-wires with their edges upward at the fell of the cloth, but only employed to successively hold said wires in position to be acted upon by the pinchers or other instruments which draw them from the cloth, instead of acting upon the wire nearest to the reed, and thus hold all the wires which are in the cloth, may be applied to the wire farthest from the reed—that is, directly to the wire to be acted upon by said pinchers or other instruments. I sometimes, also, apply a projection to the box or holder to extend forward over the enlarged part of the wires which project from the cloth to prevent them from rising above a proper line. Instead, also, of applying the support or guide $k^3$, which moves in unison with the pincers to receive the ends of the pile-wires as they are withdrawn from the cloth, so that it shall descend to clear the pinchers, as above described, it may be applied above the pinchers and wires, and in the form represented in Fig. 13—that is to say, two fingers may be employed with a recess in each, so arranged as to open and close to successively clasp and release the wires. Instead, also, of having the said support or guide $k^3$ elevated and depressed in the manner above described, it may be attached to a shaft, the rocking of which shall elevate and depress said guide, as represented in Fig. 14. Instead, also, of operating said support or guide $k^3$ by a cam on a shaft of the loom, it may be operated by the pincher-stand $x$, as represented in Fig. 15, in which $a^7$ represents a shaft, to which the said support or guide $k^3$ is attached; $b^7$, the cam-bar and $c^7$ a cam on the pincher-stand $x$, which elevates and depresses the support or guide $k^3$ by acting on the said cam-bar $b^7$ as the said pincher-stand $x$ is moved toward and from the cloth. The number of these guides to be employed may vary according to the size and length of the pile-wires. Instead, also, of employing cords or wires to guide and support the pile-wires as they pass between the warps, a long guide, similar to that represented by $e^7$, Fig. 12, may be used, said long guide $e^7$ being connected with a bar which shall be vibrated or elevated to bring said guides up into the shed of the warps at the proper time to guide the wires and withdraw them again during the operation of weaving. Instead, also, of applying the yielding bar $p^4$ for allowing the pinchers to yield to the action of the aforesaid box or holder, it may be applied to the cam $j^2$ by making a portion of one of its flanges to yield against a spring in a similar manner to that in which the said sliding bar $p^4$ yields against the spring $q^4$. Instead, also, of the aforesaid box or holder being stationary or held firmly at the time the pinchers or their equivalents engage with the pile-wires to cause the said pinchers to yield, as above described, it may be left free to vibrate with the pile-wires and yield to the action of the said pinchers—that is to say, instead of the pinchers yielding to the box or holder to adapt the pinchers to the wires the said box or holder may yield to the pinchers. When the box or holder is made to yield to the pinchers, the parts which move said pinchers toward and from the box may be rigid.

In weaving some descriptions of velvet-pile fabrics it is necessary to have a greater tension on the figuring or pile warps at certain stages of the operation than at others, to effect which I employ a cam on the main shaft of the loom to act upon a lever so as to release and apply an extra weight to the vibrating roller or other device employed to give tension to said warps.

All the parts of my invention may be used together or separately in the same loom without affecting their character, but so long as any one part is used to accomplish the same end it will partake of the nature of my invention.

Having fully described the various parts of my invention and pointed out some of its modifications, what I claim as new therein, and desire to secure by Letters Patent, is as follows, viz:

1. The method of constructing and operating the pinchers or other equivalents for successively operating the pile-wires so that they shall carry said pile-wires forward to the fell of the cloth and hold them in position, with their proper edges upward, until they are otherwise secured, substantially as specified.

2. Constructing the pinchers for successively operating the pile-wires with grooved jaws opening and closing in a line with the pile-wire, and with a motion in advance of the lathe, substantially as specified, whereby collision with the lathe is easily avoided.

3. The employment of a support or guide to successively receive the inner ends of the pile-wires as they are drawn from the cloth and carry them to the position where they are to be introduced into the shed of the warps and guide them therein, substantially as specified.

4. The employment of long horizontal guides to guide the pile-wires as they are being inserted in the shed of the warps, substantially as specified.

5. Holding the pile-wires and guiding and adapting the pinchers or their equivalents to a suitable position to engage therewith, substantially as specified.

6. In combination with the pile-wires, a bar or guide which shall successively press against said pile-wires to keep them in a proper position during the operation of cutting the pile, substantially as specified.

7. The method of applying the tension weight and brake directly to the whip-roller by means of the arms $g^6$ and $i^6$, substantially in the manner and for the purpose specified.

E. B. BIGELOW.

Witnesses:

FRANK F. HASTINGS,
JOEL GILES.